US010517286B2

(12) United States Patent
Miller et al.

(10) Patent No.: US 10,517,286 B2
(45) Date of Patent: Dec. 31, 2019

(54) SOFT START MOTOR CONTROL SYSTEM FOR AN IRRIGATION SYSTEM

(71) Applicant: LINDSAY CORPORATION, Omaha, NE (US)

(72) Inventors: Mark William Miller, Elkhorn, NE (US); Bradford Ellison, Omaha, NE (US)

(73) Assignee: Lindsay Corporation, Omaha, NE (US)

( * ) Notice: Subject to any disclaimer, the term of this patent is extended or adjusted under 35 U.S.C. 154(b) by 251 days.

(21) Appl. No.: 15/684,423

(22) Filed: Aug. 23, 2017

(65) Prior Publication Data
US 2019/0059352 A1   Feb. 28, 2019

(51) Int. Cl.
| *A01M 7/00* | (2006.01) |
| *A01C 23/04* | (2006.01) |
| *B05B 13/04* | (2006.01) |
| *H02P 1/56* | (2006.01) |
| *H02P 3/18* | (2006.01) |

(Continued)

(52) U.S. Cl.
CPC ......... *A01M 7/0092* (2013.01); *A01C 23/042* (2013.01); *A01M 7/0071* (2013.01); *B05B 13/04* (2013.01); *B05B 15/62* (2018.02); *H02P 1/56* (2013.01); *H02P 3/18* (2013.01); *H02P 27/02* (2013.01); *H02P 2207/01* (2013.01)

(58) Field of Classification Search
None
See application file for complete search history.

(56) References Cited

U.S. PATENT DOCUMENTS

| 4,028,599 A | * | 6/1977 | Zankl | .................. | G05B 19/237 |
| | | | | | 318/803 |
| 4,461,985 A | * | 7/1984 | Stitt | ....................... | H02P 27/02 |
| | | | | | 318/727 |

(Continued)

FOREIGN PATENT DOCUMENTS

CN          103348898          10/2013

OTHER PUBLICATIONS

Rural Electricity Resource Council Publication; Options Beyond Three-Phase for Serving Remote Motor Loads; https://www.rerc.org/pdf_files/three_phase_options.pdf.
(Continued)

*Primary Examiner* — Richard M Camby
(74) *Attorney, Agent, or Firm* — Hovey Williams LLP

(57) ABSTRACT

An irrigation system broadly comprising a number of irrigation spans and a control system configured to operate single speed drive motors of the irrigation spans in a start-up mode, full speed mode, and wind-down mode. In the start-up mode, the motor controller gradually increases the drive motor speed from 0 rpms to a full speed by ramping a voltage applied to the drive motor from a starting voltage to a full speed voltage according to a start-up voltage profile over a start-up time interval. In the full speed mode, the motor controller operates the drive motor at a full speed voltage. In the wind-down mode, the motor controller gradually decreases the drive motor speed from full speed to 0 rpms by ramping the voltage applied to the drive motor from the full speed voltage to an ending voltage according to a wind-down voltage profile over a wind-down time interval.

21 Claims, 4 Drawing Sheets

(51) Int. Cl.
     *H02P 27/02*     (2016.01)
     *B05B 15/62*     (2018.01)

(56) References Cited

U.S. PATENT DOCUMENTS

| | | |
|---|---|---|
| 5,969,957 A | 10/1999 | Divan et al. |
| 6,755,362 B2 | 6/2004 | Krieger et al. |
| 8,948,979 B2 | 2/2015 | Malsam |
| 9,119,386 B2 | 9/2015 | Tiu et al. |
| 2007/0267524 A1 | 11/2007 | Mack |
| 2012/0053776 A1 | 3/2012 | Malsam et al. |
| 2012/0305682 A1 | 12/2012 | Korus |
| 2013/0018553 A1 | 1/2013 | Malsam |
| 2015/0129680 A1 | 5/2015 | Abts et al. |
| 2015/0351335 A1 | 12/2015 | Abts et al. |

OTHER PUBLICATIONS

Smith Electric Motorworks GWM; Rotomax Center-Pivot Phase Converter; For Operating 460-500 Volt 3-Phase Center-Pivot Systems and Irrigation Pumps on Single Phase Electric Power; http://www.gwm4-3phase.com/page13.html.

International Search Report and Written Opinion for PCT Appln. No. PCT/US2018/030203; dated Jan. 28, 2019 and all references cited therein.

\* cited by examiner

SOFT START MOTOR CONTROL SYSTEM FOR AN IRRIGATION SYSTEM

BACKGROUND

Irrigation systems such as center pivot and linear irrigation systems have a number of irrigation spans each supported by a mobile support tower powered by a drive motor. The drive motors are typically single speed motors that are frequently switched on and off for different lengths of time to move the irrigation spans at different rates of speed. The single speed drive motors accelerate and decelerate very rapidly when switched on and off, which applies significant loads and torques to the irrigation spans and the drive trains connecting the drive motors to the wheels of the mobile support towers. The high torques also cause the irrigation spans to oscillate back and forth, thus imposing cyclic loads on the irrigation spans and drive trains. The oscillations also cause false alignment faults between adjacent irrigation spans, thereby re-activating the drive motors and creating additional oscillations. The oscillations can propagate to other irrigation spans, thus forming a standing wave across several irrigation spans. This adds unnecessary structural fatigue cycles to the irrigation spans and drive trains and more quickly wears out electrical contacts, sensors, and other electrical components. These problems can be minimized by using variable speed motors to drive the towers, but variable speed motors are too expensive for many applications and have other limitations.

SUMMARY

Embodiments of the present invention solve the above-described and other problems and limitations by providing an improved irrigation system that eliminates high motor acceleration and high deceleration of its single speed drive motors.

An embodiment of the invention is a center pivot irrigation system broadly comprising a fixed center pivot, a number of irrigation spans, and a control system configured to operate single speed drive motors of the irrigation spans in three modes: a start-up mode, a full speed mode, and a wind-down mode. It will be understood that other irrigation systems such as linear irrigation systems and self-powered irrigation systems may be used without departing from the scope of the invention.

The center pivot may be a tower or any other support structure about which the first irrigation span pivots. The center pivot has access to a well, water tank, or other source of water and may also be coupled with a tank or other source of agricultural products to inject fertilizers, pesticides and/or other chemicals into the water for application during irrigation.

The irrigation spans each have a mobile support tower, a truss section, a conduit section, and fluid flow components. The irrigation spans are connected end-to-end from the center pivot. The end irrigation span may be an extension arm (also commonly referred to as a "swing arm" or "corner arm").

Each mobile tower includes a wheel assembly and a drive train. The wheel assembly includes a driven wheel and a free-rotating wheel, two or more driven wheels, or a single driven wheel on which the mobile tower is balanced. The drive train includes a single speed drive motor and a wheel drive gearbox.

The single speed drive motor may be a synchronous squirrel cage induction motor or any other suitable single speed or constant speed drive motor. The single speed drive motor is configured to run at 50 Hz, 60 Hz, or any other suitable frequency.

The wheel drive gearbox transfers power from the drive motor to the driven wheel(s) of the wheel assembly at a low speed and high torque. This allows the drive motor to propel the mobile support towers along an irrigation path. The wheel drive gearbox may include a viscous lubricant for smooth operation.

The truss section carries or otherwise supports one of the conduit sections. The fluid flow components may be a plurality of sprinkler heads, spray guns, drop nozzles, valves, and/or other controllable fluid flow components spaced along the conduit sections for applying water and/or other fluids to an area beneath the irrigation system. The irrigation system includes four mobile support towers; however, it may comprise any number of mobile support towers without departing from the scope of the present invention.

The control system monitors and controls the drive motors and broadly comprises a number of alignment sensors, a number of motor controllers, and a system controller. The control system may be self-contained with the irrigation system or may include remote communications equipment configured to communicate with the motor controllers and/or system controller via a wireless network.

The alignment sensor senses an angle of an irrigation span relative to an adjacent irrigation span or the center pivot and may be a contact sensor, magnetic sensor, or any other suitable rotary sensor positioned on or near the center pivot, support tower, and/or truss section. For example, contact sensors may be positioned on each truss section near the center pivot and support towers such that an electrical circuit becomes closed when one of the irrigation spans reaches a pre-set alignment angle (e.g., 10 degrees) indicating that the mobile support tower is misaligned.

The motor controller activates the drive motor according to instructions received from the system controller and may include computing components such as a processor, memory, user interface, power component, and communication component for communicating with the system controller and/or remote communications equipment over the wireless network. The motor controller may be encased in a waterproof housing or otherwise sealed from the environment to protect the motor controller from water, dust, and sunlight.

The system controller manages the motor controllers and may include computing components such as a processor, memory, power components, and communication components for communicating with the motor controllers and/or remote communications equipment over the wireless network. The system controller may run a computer program stored in or on computer-readable medium residing on or accessible by the system controller.

The control system operates the single speed drive motors in three modes: a start-up mode, a full speed mode, and a wind-down mode. All of the drive motors are controlled in a similar manner, and as such, the three operational modes will only be described with reference to one of the single speed drive motors.

In the start-up mode, the motor controller gradually increases the speed of a single speed drive motor from 0 rpms to a full speed by ramping a voltage applied to the single speed drive motor from a starting voltage to a full speed voltage according to a start-up voltage profile over a start-up time interval. The motor controller may actively ramp up the voltage or passively ramp up the voltage via an input electric current. The starting voltage, full speed voltage, voltage profile, and start-up time interval may be hardwired in motor controller circuitry or drive motor circuitry, hardcoded in motor controller software or system controller software, or pre-set according to a physical input such as a dial setting or electronic input. The start-up voltage profile may be a stepped, logarithmic, or linear, quadratic, or higher order profile. The start-up time interval may be a pre-set or pre-selected time interval and may be defined by ramp start and stop times. The drive motor output torque is increased from a starting torque to a full speed torque. The starting torque may be a non-zero torque less than the full speed torque.

The above parameters, variables, inputs, and/or outputs may be at least partially selected or optimized according to at least one of a motor size, a motor speed rating, the drive motor's position in the irrigation system, a tire size of the wheel assembly, the irrigation system's size and configuration, and field conditions such as ground moisture level and ground slope so as to minimize structural impact and span oscillation and maximum operability and alignment of the irrigation spans.

In the full speed mode, the motor controller operates the single speed drive motor at a full speed voltage and hence a full speed torque. This is the primary motor operation mode and therefore is the state to which the single speed drive motor is or should be tuned. The full speed voltage may be an actual maximum voltage permitted by the single speed drive motor or a pre-set or pre-selected maximum voltage hardwired in the motor controller circuitry or drive motor circuitry, hardcoded in the system controller software or motor controller software, or pre-set according to a physical input such as a dial setting or electronic input. The full speed voltage, full speed torque, and other full speed parameters, variables, inputs, and/or outputs may be at least partially selected or determined according to at least one of a motor size, a motor speed rating, the drive motor's position in the irrigation system, a tire size of the wheel assembly, the irrigation system's size and configuration, and field conditions such as ground moisture level and ground slope.

In the wind-down mode, the motor controller gradually decreases the speed of the drive motor from full speed to 0 rpms by ramping the voltage applied to the single speed drive motor from the full speed voltage to an ending voltage according to a wind-down voltage profile over a wind-down time interval. The motor controller may actively ramp down the voltage or passively ramp down the voltage via an input electric current. The full speed voltage, ending voltage, wind-down voltage profile, and wind-down time interval may be hardwired in the motor controller circuitry or drive motor circuitry, hardcoded in the system controller software or motor controller software, or pre-set according to a physical input such as a dial setting or electronic input. The wind-down voltage profile may be a stepped, logarithmic, or linear, quadratic, or higher order profile. The wind-down time interval may be a pre-set or pre-selected time interval and may be defined by ramp start and stop times. The drive motor output torque is also decreased from the full speed torque to an ending torque. The ending torque may be a non-zero torque less than the full speed torque.

The above parameters, variables, inputs, and/or outputs may be at least partially selected or optimized according to at least one of a motor size, a motor speed rating, the drive motor's position in the irrigation system, a tire size of the wheel assembly, the irrigation system's size and configuration, and field conditions such as ground moisture level and ground slope so as to minimize structural impact and span oscillation and maximum operability and alignment of the irrigation spans.

An exemplary power cycle for one of the single speed drive motors will now be described. First, the motor controller receives a signal from the system controller or alignment sensor indicating that the irrigation span transition to a moving state. The signal may be based on a percentage duty cycle or may be based on an alignment condition, an overwatering condition, the start of an irrigation cycle, or a system status change (e.g., a change from a system standby mode to power up mode).

The motor controller then initiates the start-up mode by gradually ramping the voltage applied to the single speed drive motor from a starting voltage to a full speed voltage according to a start-up voltage profile. In this way, the single speed drive motor gradually speeds up from 0 rpms to full speed.

The motor controller then terminates the start-up mode once the full speed voltage is reached and initiates the full speed mode by running the single speed drive motor at the full speed voltage. The motor controller may operate the single speed drive motor in the full speed mode for a significant portion of a percentage duty cycle or until an alignment condition or other condition is reached, as described above.

The motor controller may then receive a signal from the system controller or alignment sensor indicating that the irrigation span should revert to a non-moving state. The signal may be based on a percentage duty cycle or may be based on a realignment condition, an underwatering condition, the end of an irrigation cycle, or a system status change (e.g., a change from a power up mode to a system standby mode or fault mode), as described above.

The motor controller then terminates the full speed mode and initiates the wind-down mode by gradually ramping the voltage applied to the single speed drive motor from the full speed voltage to an ending voltage according to a wind-down voltage profile. In this way, the single speed drive motor gradually slows down from full speed to 0 rpms. The motor controller terminates the wind-down mode once the ending voltage is reached.

The above-described irrigation system provides several advantages over conventional irrigation systems. For example, gradually increasing motor speeds at motor startup and gradually decreasing motor speeds at motor winddown eliminates rapid acceleration and rapid deceleration, which reduces the magnitude of structural fatigue applied to the drive trains, wheel assemblies, mobile support towers, and irrigation spans. Gradually increasing motor speeds at motor startup and gradually decreasing motor speeds at motor winddown also reduces or eliminates irrigation span standing waves or oscillations formed from alignment switches erroneously closing and drive motors erroneously being activated. This also reduces the number of structural fatigue cycles applied to the drive trains, wheel assemblies, mobile support towers, and irrigation spans and reduces the number of electrical cycles endured by the alignment sensors, motor controllers, and other electronic components.

The control system starts the single speed drive motors at a lower start-up torque than single speed motors controlled by conventional control systems and at a higher start-up torque than irrigation systems with variable speed motors. This minimizes the peak load effects from torque and acceleration on the drive trains, wheel assemblies, mobile support towers, and irrigation spans while preventing the irrigation towers from getting stuck in ruts or soft ground.

Controlling the single speed drive motors via a start-up mode, full speed mode, and wind-down mode is also an improvement over conventional variable speed drive motor control because variable speed motors are typically operated at a percentage of full power and hence at less than full torque, which often results in the wheel assemblies becoming stuck. In contrast, the single speed drive motors of the present invention have the benefit of being gradually accelerated to a full speed torque.

Parameters, variables, inputs, and/or outputs associated with the start-up mode and wind-down mode, such as starting voltage, ramp-up time interval, ending voltage, and wind-down time interval, may be at least partially selected or optimized according to at least one of a motor size, a motor speed rating, the drive motor's position in the irrigation system, a tire size of the wheel assembly, the irrigation system's size and configuration, and field conditions such as ground moisture level and ground slope. This helps minimize structural impact and span oscillations and maximum operability and alignment of the irrigation spans. Optimizing the above parameters also reduces or eliminates alignment faults and hence inconsistent operation of the drive motors.

In another embodiment, some of the single speed drive motors are operated in the start-up mode, full speed mode, and wind-down mode as described above, while other single speed drive motors are operated only in the full speed mode. For example, the single speed drive motors farther away from the center pivot may be operated in all three modes since they travel farther and hence undergo more cycles than the drive motors closer to the center pivot. Alternatively, every other single drive motor may be operated in all three modes.

In another embodiment, some of the drive motors are single speed motors operated in the start-up mode, full speed mode, and wind-down mode as described above, while some of the drive motors are variable speed motors operated in a conventional manner. For example, the drive motors farther away from the center pivot may be single speed motors while the drive motors closer to the center pivot may be variable speed motors. In another embodiment, every other drive motor is a single speed motor.

Operating only some of the drive motors in the start-up, full speed, and wind-down modes may simplify irrigation system setup and operation in some instances. For example, the drive motors farther away from the center pivot may be operated in all three modes since they travel farther and hence undergo more cycles than the drive motors closer to the center pivot. Operating every other drive motor in all three modes may be sufficient to eliminate the standing wave or oscillation effect in some instances. Each drive motor's type and the power cycle control scheme associated with each drive motor may be selected according to the drive motor's position in the irrigation system, the irrigation system's size and configuration, and field conditions such as ground moisture level and ground slope.

This summary is not intended to identify essential features of the present invention, and is not intended to be used to limit the scope of the claims. These and other aspects of the present invention are described below in greater detail.

DESCRIPTION OF THE DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Figure 1:
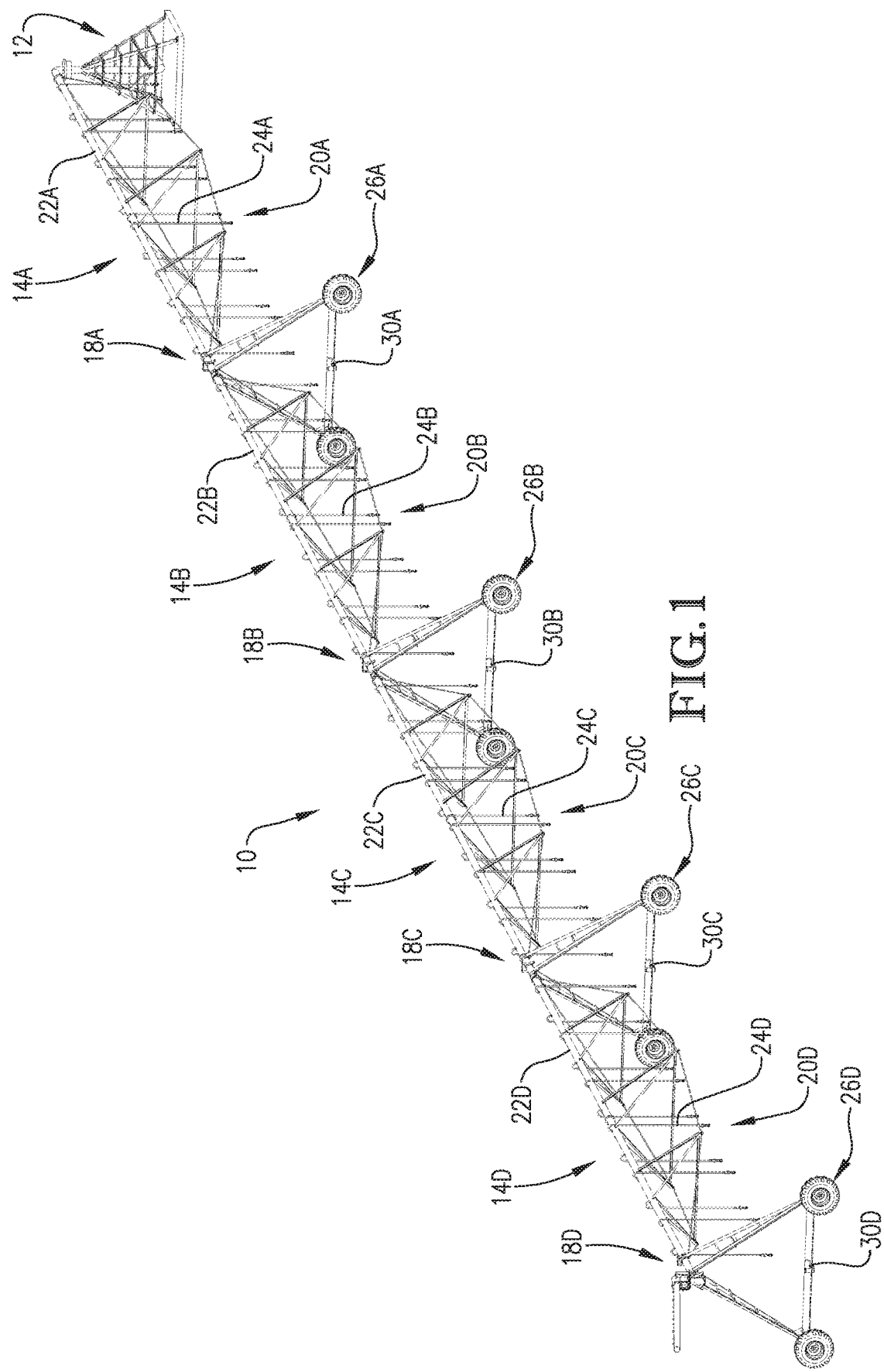
FIG. 1 is a perspective view of an exemplary fixed central pivot type irrigation system constructed in accordance with an embodiment of the invention.
Figure 2:
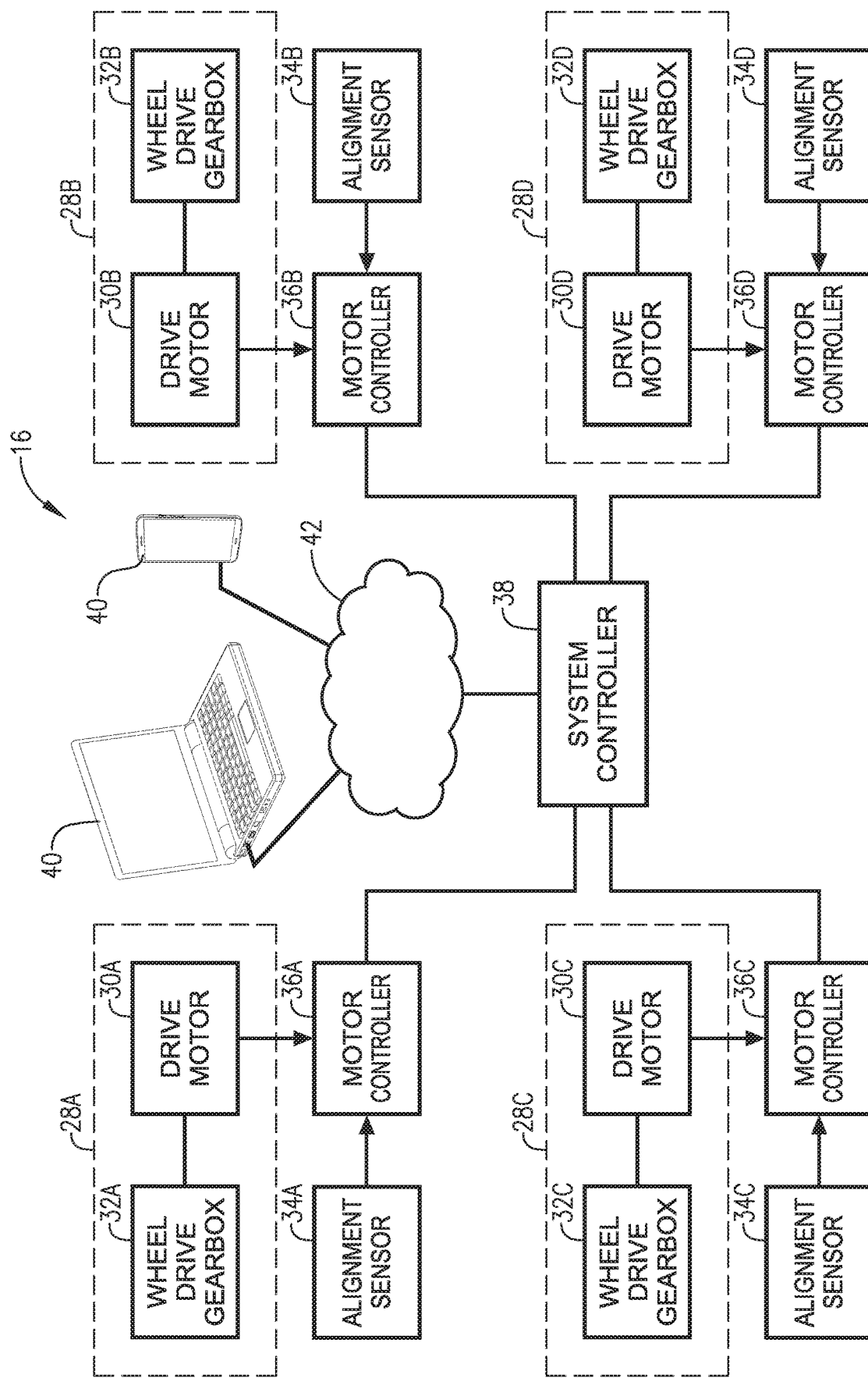
FIG. 2 is a schematic diagram of elements of a control system of the irrigation system of FIG. 1.

Turning to FIGS. 1 and 2, a center pivot irrigation system 10 constructed in accordance with an embodiment of the invention is illustrated. The irrigation system 10 broadly comprises a fixed center pivot 12, a plurality of irrigation spans 14A-D, and a control system 16 is illustrated. It will be understood that other irrigation systems such as linear irrigation systems and self-powered irrigation systems may be used without departing from the scope of the invention.

The center pivot 12 may be a tower or any other support structure about which the first irrigation span 14A pivots. The center pivot 12 has access to a well, water tank, or other source of water and may also be coupled with a tank or other source of agricultural products to inject fertilizers, pesticides and/or other chemicals into the water for application during irrigation.

The irrigation spans 14A-D each have a mobile support tower 18A-D, a truss section 20A-D, a conduit section 22A-D, and fluid flow components 24A-D. The irrigation spans 14A-D are connected end-to-end from the center pivot 12. The end irrigation span 14D may be an extension arm (also commonly referred to as a "swing arm" or "corner arm").

The mobile tower 18A-D includes a wheel assembly 26A-D and a drive train 28A-D (FIG. 2). The wheel assembly 26A-D includes a driven wheel and a free-rotating wheel, two or more driven wheels, or a single driven wheel on which the mobile tower 18A-D is balanced. The drive train 28A-D includes a single speed drive motor 30A-D and a wheel drive gearbox 32A-D.

The single speed drive motor 30A-D may be a synchronous squirrel cage induction motor or any other suitable constant speed drive motor configured to run at 50 Hz, 60 Hz, or any other suitable frequency.

The wheel drive gearbox 32A-D transfers power from the single speed drive motor 30A-D to the driven wheel(s) of the wheel assembly 26A-D at a low speed and high torque. This allows the single speed drive motor 30A-D to propel the mobile support towers 18A-D along an irrigation path. The wheel drive gearbox 32A-D may include a viscous lubricant for smooth operation.

The truss section 20A-D carries or otherwise supports one of the conduit sections 22A-D. The fluid flow components 24A-D may be a plurality of sprinkler heads, spray guns, drop nozzles, valves, and/or other controllable fluid flow components spaced along the conduit sections 22A-D for applying water and/or other fluids to an area beneath the irrigation system 10. The irrigation system 10 includes four mobile support towers 18A-D; however, it may comprise any number of mobile support towers without departing from the scope of the present invention.

The control system 16 monitors and controls the single speed drive motors 30A-D and broadly comprises a plurality of alignment sensors 34A-D, a plurality of motor controllers 36A-D, and a system controller 38. The control system 16 may be self-contained with the irrigation system 10 or may include remote communications equipment 40 configured to communicate with the motor controllers 36A-D and/or system controller 38 via a wireless network 42.

The alignment sensor 34A-D senses an angle of an irrigation span 14A-D relative to an adjacent irrigation span or center pivot 12 and may be a contact sensor, magnetic sensor, or any other suitable rotary sensor positioned on or near the center pivot 12, support tower 18A-C, and/or truss section 20A-D. For example, contact sensors may be positioned on each truss section 20A-D near the center pivot 12 and support towers 18A-C such that an electrical circuit becomes closed when one of the irrigation spans 14A-D reaches a pre-set alignment angle (e.g., 10 degrees) indicating that the mobile support tower 18A-D is misaligned.

The motor controller 36A-D activates the single speed drive motor 30A-D according to instructions received from the system controller 38 and may include computing components such as a processor, memory, user interface, power component, and communication component for communicating with the system controller 38 and/or remote communications equipment 40 over the wireless network 42. The motor controller 38A-D may be encased in a waterproof housing or otherwise sealed from the environment to protect the motor controller 38A-D from water, dust, and sunlight.

The system controller 38 manages the motor controllers 36A-D and may include computing components such as a processor, memory, power components, and communication components for communicating with the motor controllers 36A-D and/or remote communications equipment 40 over the wireless network 42. The system controller 38 may run a computer program stored in or on computer-readable medium residing on or accessible by the system controller 38. The computer programs preferably comprise ordered listings of executable instructions for implementing logical functions in the system controller 38, motor controllers 36A-D and/or remote communications equipment 40. The computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The computer-readable medium may be one or more components incorporated into the motor controllers 36A-D, system controller 38, and/or remote communications equipment or computing devices 40.

The memory of the system controller 38 may include, for example, removable and non-removable memory elements such as RAM, ROM, flash, magnetic, optical, USB memory devices, and/or other conventional memory elements. The memory may store various data associated with the control system 16, such as the computer program and code segments mentioned above, or other data for instructing the motor controllers 36A-D to perform the steps described herein. Further, the memory may store data retrieved from the motor controllers 36A-D and remote communications equipment or computing devices 40.

Figure 3:
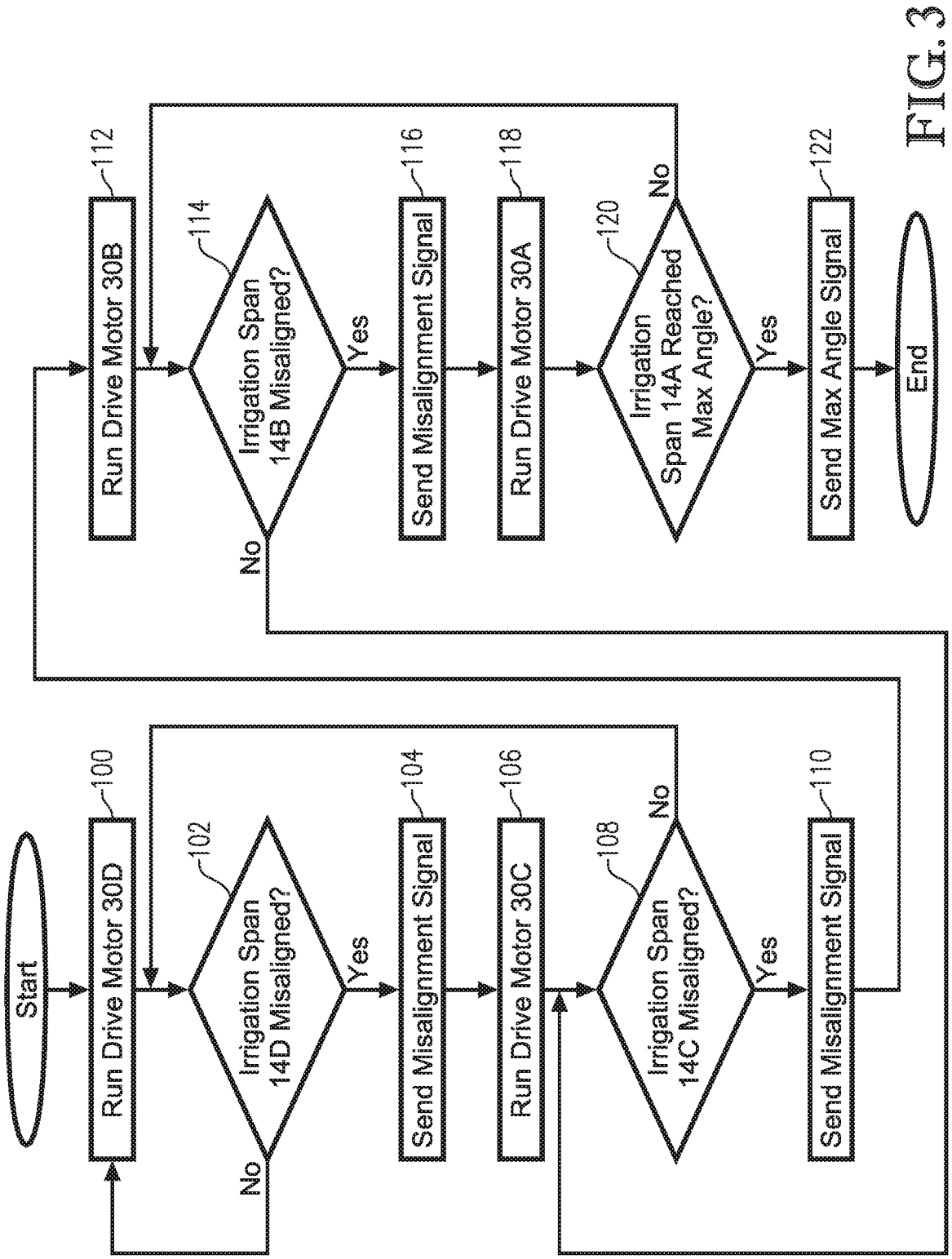
FIG. 3 is a flowchart illustrating steps involved in an irrigation span alignment control scheme.

Turning to FIG. 3, an exemplary alignment control scheme for controlling movement of the mobile support towers 18A-D around the center pivot 12 will now be described in detail. First, the motor controller 36D activates the end single speed drive motor 30D according to a preselected percent duty cycle representing the percentage of a minute or other unit of time that the end mobile irrigation tower 18D should move forward, as shown in block 100 of FIG. 3. In this way, the end mobile irrigation tower 18D acts as a pacing tower for the rest of the irrigation spans 14A-C. Once the end irrigation span 14D reaches a predetermined misalignment angle relative to the adjacent irrigation span 14C, the alignment sensor 34D sends a signal to the system controller 38 indicating that the end irrigation span 14D is misaligned, as shown in blocks 102 and 104. The end motor controller 36D then deactivates the single speed drive motor 30D and/or the motor controller 36C runs the single speed drive motor 30C, as shown in block 106, until irrigation span 14D is aligned again, as shown in previous block 102.

The mobile support towers 18C and 18D are moved in this manner until irrigation span 14C reaches a predetermined misalignment angle relative to the adjacent irrigation span 14B, as shown in block 108. At this point, the alignment sensor 34C sends a signal to the system controller 38 indicating that the irrigation span 14C is misaligned, as shown in block 110. The motor controller 36C then deactivates the single speed drive motor 30C and/or the motor controller 36B runs the single speed drive motor 30B, as shown in block 112, until irrigation span 14C is aligned again, as shown in previous block 108.

The mobile support towers 18B, 18C, and 18D are moved in this manner until irrigation span 14B reaches a predetermined misalignment angle relative to the adjacent irrigation span 14A, as shown in block 114. At this point, the alignment sensor 34B sends a signal to the system controller 38 indicating that the irrigation span 14B is misaligned, as shown in block 116. The motor controller 36B then deactivates the single speed drive motor 30B and/or the motor controller 36A runs the single speed drive motor 30A, as shown in block 118, until irrigation span 14B is aligned again, as shown in previous block 114.

The mobile support towers 18A-D are moved in this manner until irrigation span 14A reaches a predetermined angle relative to the center pivot 12 indicating that the irrigation system has reached the end of a field, an obstacle, or other checkpoint, or has completed an irrigation cycle, as shown in block 120. At this point, the alignment sensor 34A sends a signal to the system controller 38 indicating that the irrigation span 14A has reached the predetermined angle, as shown in block 122. The control system 16 then continues controlling the irrigation system 10 according to the signal received from the alignment signal. For example, if the irrigation system 10 has reached the end of the field, the control system 16 may reverse direction of the irrigation system 10. If the irrigation system 10 has completed an irrigation cycle, the control system 16 may begin another irrigation cycle or may go into a standby or shutdown mode.

The control system 16 operates the single speed drive motors 30A-D in three modes: a start-up mode, a full speed mode, and a wind-down mode. Operation of each single speed drive motor 30A-D in the three modes is substantially identical, and as such, the three modes will only be described with reference to single speed drive motor 30A.

In the start-up mode, the motor controller 36A gradually increases the speed of the single speed drive motor 30A from 0 rpms to a full speed by ramping a voltage applied to the single speed drive motor 30A from a starting voltage to a full speed voltage according to a start-up voltage profile over a start-up time interval. The motor controller 36A may actively ramp up the voltage or passively ramp up the voltage via an input electric current. The starting voltage, full speed voltage, voltage profile, and start-up time interval may be hardwired in motor controller circuitry or drive motor circuitry, hardcoded in motor controller software or system controller software, or pre-set according to a physical input such as a dial setting or electronic input. The start-up voltage profile may be a stepped, logarithmic, or linear, quadratic, or higher order profile. The start-up time interval may be a pre-set or pre-selected time interval and may be defined by ramp start and stop times. The single speed drive motor 30A output torque is increased from a starting torque to a full speed torque. The starting torque may be a non-zero torque less than the full speed torque. The above parameters, variables, inputs, and/or outputs may be at least partially selected or optimized according to at least one of a motor size, a motor speed rating, the single speed drive motor's position in the irrigation system 10, a tire size of the wheel assembly 26A, the irrigation system's size and configuration, and field conditions such as ground moisture level and ground slope so as to minimize structural impact and span oscillation and maximum operability and alignment of the irrigation spans 14A-D.

In the full speed mode, the motor controller 36A operates the single speed drive motor 30A at a full speed voltage and hence a full speed torque. This is the primary motor operation mode and therefore is the state to which the single speed drive motor 30A is or should be tuned. The full speed voltage may be an actual maximum voltage permitted by the single speed drive motor 30A or a pre-set or pre-selected maximum voltage hardwired in the motor controller circuitry or drive motor circuitry, hardcoded in the system controller software or motor controller software, or pre-set according to a physical input such as a dial setting or electronic input. The full speed voltage, full speed torque, and other full speed parameters, variables, inputs, and/or outputs may be at least partially selected or determined according to at least one of a motor size, a motor speed rating, the single speed drive motor's position in the irrigation system 10, a tire size of the wheel assembly 26A, the irrigation system's size and configuration, and field conditions such as ground moisture level and ground slope.

In the wind-down mode, the motor controller 36A gradually decreases the speed of the single speed drive motor 30A from full speed to 0 rpms by ramping the voltage applied to the single speed drive motor 30A from the full speed voltage to an ending voltage according to a wind-down voltage profile over a wind-down time interval. The motor controller 36A may actively ramp down the voltage or passively ramp down the voltage via an input electric current. The full speed voltage, ending voltage, wind-down voltage profile, and wind-down time interval may be hardwired in the motor controller circuitry or drive motor circuitry, hardcoded in the system controller software or motor controller software, or pre-set according to a physical input such as a dial setting or electronic input. The wind-down voltage profile may be a stepped, logarithmic, or linear, quadratic, or higher order profile. The wind-down time interval may be a pre-set or pre-selected time interval and may be defined by ramp start and stop times. The single speed drive motor 30A output torque is also decreased from the full speed torque to an ending torque. The ending torque may be a non-zero torque less than the full speed torque. The above parameters, variables, inputs, and/or outputs may be at least partially selected or optimized according to at least one of a motor size, a motor speed rating, the single speed drive motor's position in the irrigation system 10, a tire size of the wheel assembly 26A, the irrigation system's size and configuration, and field conditions such as ground moisture level and ground slope so as to minimize structural impact and span oscillation and maximum operability and alignment of the irrigation spans 14A-D.

Figure 4:
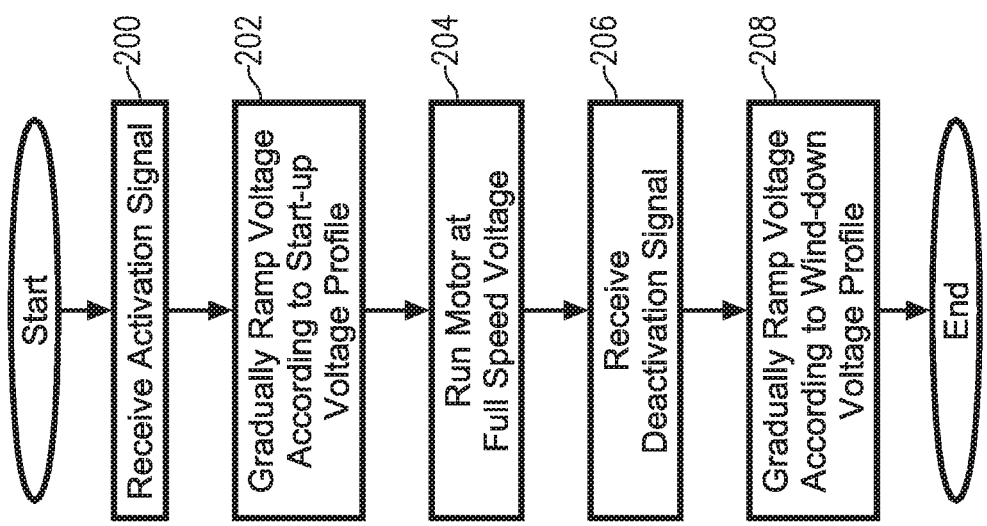
FIG. 4 is a flowchart illustrating a drive motor power cycle.

Turning to FIG. 4, an exemplary power cycle for single speed drive motor 30A will now be described. First, the motor controller 36A receives a signal from the system controller 38 or alignment sensor 34A indicating that the irrigation span 14A transition to a moving state, as shown in block 200. The signal may be based on a percentage duty cycle or may be based on an alignment condition, an overwatering condition, the start of an irrigation cycle, or a system status change (e.g., a change from a system standby mode to power up mode).

The motor controller 36A then initiates the start-up mode by gradually ramping the voltage applied to the single speed drive motor 30A from a starting voltage to a full speed voltage according to a start-up voltage profile, as shown in block 202. In this way, the single speed drive motor 30A gradually speeds up from 0 rpms to full speed.

The motor controller 36A then terminates the start-up mode once the full speed voltage is reached and initiates the full speed mode by running the single speed drive motor 30A at the full speed voltage, as shown in block 204. The motor controller 36A may operate the single speed drive motor 30A in the full speed mode for a significant portion of a percentage duty cycle or until an alignment condition or other condition is reached, as described above.

The motor controller 36A may then receive a signal from the system controller 38 or alignment sensor 34A indicating that the irrigation span 14A should revert to a non-moving state, as shown in block 206. The signal may be based on a percentage duty cycle or may be based on a realignment condition, an underwatering condition, the end of an irrigation cycle, or a system status change (e.g., a change from a power up mode to a system standby mode or fault mode), as described above.

The motor controller 36A then terminates the full speed mode and initiates the wind-down mode by gradually ramping the voltage applied to the single speed drive motor 30A from the full speed voltage to an ending voltage according to a wind-down voltage profile, as shown in block 208. In this way, the single speed drive motor 30A gradually slows down from full speed to 0 rpms. The motor controller 36A terminates the wind-down mode once the ending voltage is reached.

The above-described irrigation system 10 provides several advantages over conventional irrigation systems. For example, gradually increasing motor speeds at motor startup and gradually decreasing motor speeds at motor winddown eliminates rapid acceleration and rapid deceleration, which reduces the magnitude of structural fatigue applied to the drive trains 28A-D, wheel assemblies 26A-D, mobile support towers 18A-D, and irrigation spans 14A-D. Gradually increasing motor speeds at motor startup and gradually decreasing motor speeds at motor winddown also reduces or eliminates irrigation span standing waves or oscillations formed from alignment switches erroneously closing and drive motors erroneously being activated. This reduces the number of structural fatigue cycles applied to the drive trains 28A-D, wheel assemblies 26A-D, mobile support towers 18A-D, and irrigation spans 14A-D and reduces the number of electrical cycles endured by the alignment sensors 34A-D, motor controllers 36A-D, and other electronic components.

The control system 16 starts the single speed drive motors 30A-D at a lower start-up torque than single speed motors controlled by conventional control systems and at a higher start-up torque than irrigation systems with variable speed motors. This minimizes the peak load effects from torque and acceleration on the drive trains 28A-D, wheel assemblies 26A-D, mobile support towers 18A-D, and irrigation spans 14A-D while preventing the irrigation towers 18A-D from getting stuck in ruts or soft ground.

Controlling the single speed drive motors 30A-D via a start-up mode, full speed mode, and wind-down mode is also an improvement over conventional variable speed drive motor control because variable speed motors are typically operated continuously at a percentage of full power and hence at less than full torque, which often results in the wheel assemblies becoming stuck. In contrast, the single speed drive motors 30A-D have the benefit of being gradually accelerated to a full speed torque.

Parameters, variables, inputs, and/or outputs associated with the start-up mode and wind-down mode, such as starting voltage, ramp-up time interval, ending voltage, and wind-down time interval, may be at least partially selected or optimized according to at least one of a motor size, a motor speed rating, the single speed drive motor's position in the irrigation system 10, a tire size of the wheel assembly 26A-D, the irrigation system's size and configuration, and field conditions such as ground moisture level and ground slope. This helps minimize structural impact and span oscillations and maximum operability and alignment of the irrigation spans 14A-D. Optimizing the above parameters also reduces or eliminates alignment faults and hence inconsistent operation of the single speed drive motors 30A-D.

In another embodiment, only some of the single speed drive motors 30A-D are operated in the start-up mode, full speed mode, and wind-down mode as described above. For example, the outer single speed drive motors 30C and 30D of the center pivot irrigation system 10 may be operated in all three modes since they travel farther and hence undergo more cycles than the inner single speed drive motors 30A and 30B. Alternatively, every other drive motor, such as single speed drive motors 30B and 30D, may be operated in all three modes while single speed drive motors 30A and 30C are operated only in the full speed mode.

In another embodiment, some of the drive motors 30A-D are single speed motors operated in the start-up mode, full speed mode, and wind-down mode as described above, while some of the drive motors 30A-D are variable speed motors operated in a conventional manner. For example, the drive motors farther away from the center pivot 12 (e.g., drive motors 30C and 30D) may be single speed motors, while the drive motors closer to the center pivot 12 (e.g., drive motors 30A and 30B) are variable speed motors. In another embodiment, every other drive motor (e.g., drive motors 30B and 30D) is a single speed motor, while the other drive motors (e.g., drive motors 30A and 30C) are variable speed motors operated in a conventional manner.

Operating only some of the drive motors 30A-D in the start-up, full speed, and wind-down modes while operating some of the drive motors 30A-D only in the full speed mode or in a conventional manner may simplify irrigation system setup and operation in some instances. For example, the outer drive motors 30C and 30D of the center pivot irrigation system 10 may be operated in all three modes since they travel farther and hence undergo more cycles than the inner drive motors 30A and 30B while the inner drive motors 30A and 30B are operated only in the full speed mode or in a conventional manner. Operating every other drive motor, such as drive motors 30B and 30D, in all three modes while operating drive motors 30A and 30C only in the full speed mode or in a conventional manner may be sufficient to eliminate the standing wave or oscillation effect in some instances. The drive motor type and power cycle control scheme associated with each drive motor 30A-D may be selected according to the drive motor's position in the irrigation system, the irrigation system's size and configuration, and field conditions such as ground moisture level and ground slope.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. An irrigation system comprising:
   a plurality of irrigation spans, each including:
   a conduit section connected to conduit sections of adjacent irrigation spans for transporting an irrigation fluid from a fluid source to a field;
   a truss configured to support the conduit section;
   a plurality of fluid emitters connected to the conduit section for delivering the irrigation fluid to crops in the field; and
   a mobile tower connected to the truss and configured to move the truss, conduit section, and fluid emitters across the field, the mobile tower including:
   a wheel assembly for traversing the field; and
   a drive train having a single-speed motor for powering the wheel assembly; and a control system for controlling the single-speed motors of the drive trains, the control system configured to operate at least one of the single-speed motors in:
  a start-up mode in which the control system gradually increases a speed of the single-speed motor from 0 rpms to a full speed;
  a full speed mode; and
  a wind-down mode in which the control system gradually decreases the speed of the single-speed motor from the full speed to 0 rpms.

2. The irrigation system of claim 1, wherein the control system is configured to operate at least one of the single-speed motors only in the full speed mode.

3. The irrigation system of claim 1, wherein the irrigation system is a center-pivot irrigation system further comprising a center pivot, the irrigation spans including at least four irrigation spans extending end-to-end from the center pivot, the control system being configured to operate the single-speed motors of at least the two outermost irrigation spans in the start-up mode, full speed mode, and wind-down mode and the single-speed motors of at least the two innermost irrigation spans only in the full speed mode.

4. The irrigation system of claim 1, wherein the control system is configured to operate every other single-speed motor in the start-up mode, full speed mode, and wind-down mode.

5. The irrigation system of claim 1, wherein the control system initiates the start-up mode at a pre-set starting voltage less than a full speed voltage.

6. The irrigation system of claim 5, wherein the control system actively ramps applied voltage in the start-up mode from the starting voltage to the full speed voltage.

7. The irrigation system of claim 6, wherein the control system ramps applied voltage in the start-up mode from the pre-set starting voltage to the full speed voltage according to a pre-determined voltage profile.

8. The irrigation system of claim 1, wherein each irrigation span includes an alignment sensor and the control system initiates the start-up mode for the single-speed motor of one of the irrigation spans upon receiving an alignment signal from the alignment sensor of the irrigation span indicating that the irrigation span is misaligned.

9. The irrigation system of claim 1, wherein the control system operates the single-speed motors in the start-up mode for a pre-set amount of time.

10. The irrigation system of claim 1, wherein the control system initiates the start-up mode at a non-zero torque.

11. The irrigation system of claim 1, wherein a parameter of the start-up mode is at least partially determined according to at least one of a motor size, a motor speed rating, and a tire size of the wheel assembly.

12. The irrigation system of claim 1, wherein the control system terminates the wind-down mode at a pre-set ending voltage less than the full speed voltage.

13. The irrigation system of claim 12, wherein the control system actively ramps applied voltage in the wind-down mode from the full speed voltage to the ending voltage.

14. The irrigation system of claim 13, wherein the control system ramps applied voltage from the full speed voltage to the pre-set ending voltage according to a pre-determined voltage profile.

15. The irrigation system of claim 1, wherein the control system includes an alignment sensor mounted on each irrigation span and the control system initiates the wind-down mode for the single-speed motor of one of the irrigation spans upon receiving an alignment signal from the alignment sensor on the irrigation span indicating that the irrigation span has become aligned or is nearing alignment.

16. The irrigation system of claim 1, wherein the control system operates the single-speed motors in the wind-down mode for a pre-set amount of time.

17. The irrigation system of claim 1, wherein the control system terminates the wind-down mode at a non-zero torque.

18. The irrigation system of claim 1, wherein a parameter of the wind-down mode is at least partially determined according to at least one of a motor size, a motor speed rating, and a tire size of the wheel assembly.

19. The irrigation system of claim 1, wherein the single-speed motors are single-speed induction motors.

20. The irrigation system of claim 1, wherein the control system includes a plurality of controllers, each controller being mounted on one of the mobile towers for controlling one of the single-speed motors.

21. A center-pivot irrigation system comprising:
  a center pivot;
  at least four irrigation spans extending end-to-end from the center pivot, each irrigation span including:
    a conduit section connected to conduit sections of adjacent irrigation spans for transporting an irrigation fluid from a fluid source to a field;
    a truss configured to support the conduit section;
    a plurality of fluid emitters connected to the conduit section for delivering the irrigation fluid to crops in the field; and
    a mobile tower connected to the truss and configured to move the truss, conduit section, and fluid emitters across the field, the mobile tower including:
      a wheel assembly for traversing the field; and
      a drive train having a single-speed motor for powering the wheel assembly; and
  a control system for controlling the single-speed motors of the drive trains, the control system configured to operate the single-speed motors of at least the outer two irrigation spans in:
    a start-up mode in which the control system gradually ramps a voltage applied to the single-speed motor from a pre-set starting voltage to a full speed voltage over a pre-set start-up time duration according to a linear voltage profile so as to gradually increase a speed of the single-speed motor from 0 rpms to a full speed;
    a full speed mode; and
    a wind-down mode in which the control system gradually ramps the voltage applied to the single-speed motor from the full speed voltage to a pre-set ending voltage over a pre-set wind-down time duration according to a linear voltage profile so as to gradually decrease the speed of the single-speed motor from the full speed to 0 rpms,
  at least one parameter of the start-up mode and at least one parameter of the wind-down mode being at least partially determined according to at least one of a motor size, a motor speed rating, and a tire size of the wheel assemblies.

* * * * *